(12) United States Patent
Lim et al.

(10) Patent No.: US 9,232,454 B2
(45) Date of Patent: Jan. 5, 2016

(54) DATA OFFLOADING METHOD

(71) Applicant: Electronics and Telecommunications Research Institute, Daejeon (KR)

(72) Inventors: Soon Yong Lim, Daejeon (KR); Mi Jeong Yang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/484,424

(22) Filed: Sep. 12, 2014

(65) Prior Publication Data
US 2015/0148046 A1 May 28, 2015

(30) Foreign Application Priority Data

Nov. 27, 2013 (KR) ........................ 10-2013-0145689

(51) Int. Cl.
| | |
|---|---|
| *H04W 36/00* | (2009.01) |
| *H04W 36/22* | (2009.01) |
| *H04W 28/08* | (2009.01) |
| *H04W 48/00* | (2009.01) |
| *H04W 76/00* | (2009.01) |
| H04W 84/04 | (2009.01) |

(52) U.S. Cl.
CPC ............ *H04W 36/22* (2013.01); *H04W 28/085* (2013.01); *H04W 48/00* (2013.01); *H04W 76/00* (2013.01); *H04W 84/045* (2013.01)

(58) Field of Classification Search
CPC ..................... H04W 36/0022; H04W 36/0066; H04W 36/04; H04W 36/36; H04W 36/18
USPC .......................................................... 455/444
See application file for complete search history.

(56) References Cited

U.S. PATENT DOCUMENTS

| | | |
|---|---|---|
| 2011/0143759 A1 | 6/2011 | Choi et al. |
| 2015/0045038 A1* | 2/2015 | Gao ...................... H04W 36/22 455/438 |

FOREIGN PATENT DOCUMENTS

| | | |
|---|---|---|
| KR | 1020060059377 | 6/2006 |
| KR | 10-2011-0068810 | 6/2011 |

OTHER PUBLICATIONS

ETRI, "Random Access Procedure for Small Cell Enhancements," 3GPP TSG-RAN WG2 #83bis, R2-133359, 3 pages (2013).

* cited by examiner

*Primary Examiner* — Kevin Kim
(74) *Attorney, Agent, or Firm* — Nelson Mullins Riley & Scarborough LLP

(57) ABSTRACT

A method of offloading data is provided by a UE. The UE receives data from a macro cell base station over an MC-RB while an E-RAB between the macro cell base station and a gateway is established. The UE receives a first connection reconfiguration message from the macro cell base station after the E-RAB between a small cell base station and the gateway is established, and establishes an SC-RB according to the first connection reconfiguration message. Next, the UE receives a second connection reconfiguration message from the macro cell base station after a path between the macro cell base station and the gateway is switched to a path between the small cell base station and the gateway, and data for the MC-RB are exhausted on the macro cell base station. Then, the UE releases the MC-RB and switches to the SC-RB.

20 Claims, 11 Drawing Sheets

DATA OFFLOADING METHOD

CROSS-REFERENCE TO RELATED APPLICATION

This application claims priority to and the benefit of Korean Patent Application No. 10-2013-0145689 filed in the Korean Intellectual Property Office on Nov. 27, 2013, the entire contents of which is incorporated herein by reference.

BACKGROUND (a) Field

The described technology generally relates to a data offloading method.

(b) Description of the Related Art

A mobile communication system provides various schemes for accommodating increased data. A scheme expanding the coverage by down-sizing and concentrating cells is one of the schemes. In this scheme, it is difficult to control the interference and the handover frequently occurs. In addition, because a time or location at which or in which data occur is varied, constructing fixed cells increases capital expenditure (CAPEX).

Data offloading schemes are suggested to solve the data traffic problem. Particularly, a small cell offloading scheme attaching a small cell to a macro cell and allowing traffics of the macro cell to flow in the small cell is being developed.

Flowing user's data traffics in the small cell means that the user does not perform a conventional inter-cell handover. Therefore, the small cell offloading scheme requires a new handover that offloads data traffics of the user to the small cell.

SUMMARY OF THE INVENTION

An embodiment of the present invention provides a data offloading method for efficiently offloading data traffics of a user to another cell.

According to another embodiment of the present invention, a method of offloading data is provided by a user equipment (UE). The method includes receiving data from a macro cell base station over a first radio bearer between the UE and the macro cell base station while a radio access bearer between the macro cell base station and a gateway is established, receiving a first connection reconfiguration message from the macro cell base station after a radio access bearer between a small cell base station and the gateway is established, and establishing a second radio bearer between the UE and the small cell base station according to the first connection reconfiguration message. The method further includes receiving a second connection reconfiguration message from the macro cell base station after a path between the macro cell base station and the gateway is switched to a path between the small cell base station and the gateway, and data for the first radio bearer are exhausted on the macro cell base station, and releasing the first radio bearer and switching to the second radio bearer according to the second connection reconfiguration message.

The method may further include buffering data transmitted from the small cell base station in the second radio bearer while the data for the first radio bearer are exhausted. In this case, switching to the second radio bearer may include delivering the buffered data for the second radio bearer to a higher layer.

The method may further include maintaining the first radio bearer while establishing the second radio bearer.

The method may further include receiving a timing adjustment value for the UE from the macro cell base station. In this case, a random access process to the small cell base station may be omitted when the timing adjustment value is received.

According to yet another embodiment of the present invention, a method of offloading data is provided by a macro cell base station. The method includes transmitting data to a UE over a first radio bearer between the UE and the macro cell base station while a radio access bearer between the macro cell base station and a gateway is established, and transmitting a radio access bearer setup request to a small cell base station. The method further includes transmitting a first connection reconfiguration message to the UE to request for establishing a second radio bearer between the UE and the small cell base station after the radio access bearer between the small cell base station and the gateway is established, and transmitting a handover command to the small cell base station after the second radio bearer is established. The method further includes receiving an end marker indicating an end of data from the gateway after a path between the macro cell base station and the gateway is switched to a path between the small cell base station and the gateway according to the handover command, and transmitting a second connection reconfiguration message to the UE to request for switching the first radio bearer to the second radio bearer when data for the first radio bearer are exhausted.

The method may further include maintaining the first radio bearer while the second radio bearer is established.

The method may further include transmitting to the UE a timing adjustment value for the UE.

According to yet another embodiment of the present invention, a method of offloading data is provided by a macro cell base station. The method includes transmitting data to a UE over a first radio bearer between the UE and the macro cell base station while a radio access bearer between the macro cell base station and a gateway is established, receiving a bearer setup request message from a mobility management entity according to a request of the gateway, and transmitting a radio access bearer configuration request message to a small cell base station according to the bearer setup request message. The method further includes transmitting a connection reconfiguration message to the UE to request for establishing a second radio bearer between the UE and the small cell base station after the radio access bearer between the small cell base station and the gateway is established according to the radio access bearer configuration request message, and transmitting a response message of the bearer setup request message to the mobility management entity after the second radio bearer is established.

The radio access bearer configuration request message may include S1 interface information issued by the gateway.

The method may further include receiving a radio access bearer configuration request acknowledgement message from the small cell base station after the radio access bearer between the small cell base station and the gateway is established. In this case, the radio access bearer configuration request acknowledgement message may include S1 interface configuration information necessary for an S1 connection between the small cell base station and the gateway.

According to yet another embodiment of the present invention, a method of offloading data is provided by a small cell base station. The method includes receiving a radio access bearer configuration request message from a macro cell base station according to a request of the gateway while data are transmitted to a UE over a first radio bearer between the UE and the macro cell base station, establishing a radio access bearer between the small cell base station and the gateway according to the radio access bearer configuration request message, and transmitting a radio access bearer configuration request acknowledgement message to the macro cell base station. A second radio bearer between the UE and the small cell base station is established after the radio access bearer configuration request acknowledgement message is transmitted.

The radio access bearer configuration request message may include S1 interface information issued by the gateway.

The radio access bearer configuration request acknowledgement message may include S1 interface configuration information necessary for an S1 connection between the small cell base station and the gateway.

The method may further include transmitting to the UE a timing adjustment value for the UE.

According to yet another embodiment of the present invention, a method of offloading data is provided by a UE. The method includes receiving data from a small cell base station over a first radio bearer between the UE and the small cell base station while a radio access bearer between the small cell base station and a gateway is established, receiving a first connection reconfiguration message from a macro cell base station, and establishing a second radio bearer between the UE and the macro cell base station according to the first connection reconfiguration message. The method further includes receiving a second connection reconfiguration message from the macro cell base station after a path between the small cell base station and the gateway is switched to a path between the macro cell base station and the gateway, and data for the first radio bearer are exhausted on the small cell base station, and releasing the first radio bearer and switching to the second radio bearer according to the second connection reconfiguration message.

The method may further include buffering data transmitted from the macro cell base station in the second radio bearer while the data for the first radio bearer are exhausted. In this case, switching to the second radio bearer may include delivering the buffered data for the second radio bearer to a higher layer.

The method may further include maintaining the first radio bearer while establishing the second radio bearer.

According to yet another embodiment of the present invention, a method of offloading data is provided by a macro cell base station. The method includes transmitting a first connection reconfiguration message to a UE to request for establishing a first radio bearer between the UE and the macro cell base station while data are transmitted over a second radio bearer between the UE and the small cell base station, and transmitting a path switch request to a mobility management entity after the first radio bearer is established. The method further includes receiving a radio access bearer release indication message from the small cell base station after a path between the small cell base station and the gateway is switched to a path between the macro cell base station and the gateway, and transmitting a second connection reconfiguration message to the UE to request for switching the first radio bearer to the second radio bearer according to the radio access bearer release indication message.

The radio access bearer release indication message may be transmitted when data for the first radio bearer are exhausted in the small cell base station.

The second radio bearer may be maintained while the first radio bearer is established.

DETAILED DESCRIPTION OF THE EMBODIMENTS

Figure 1:
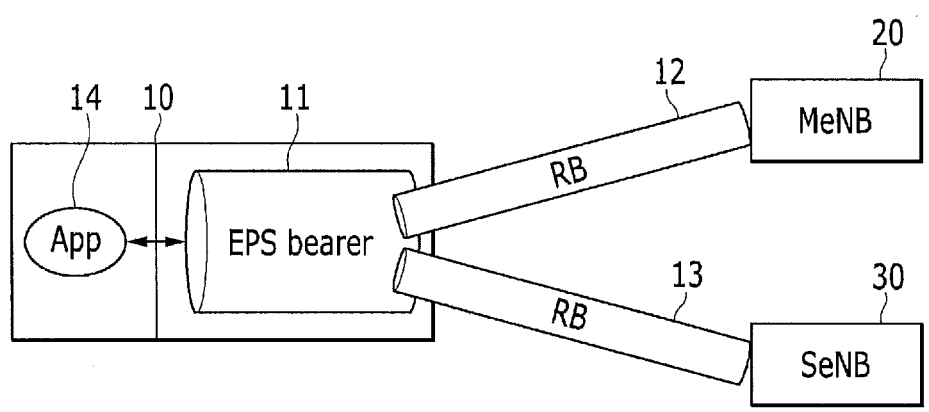
FIG. 1 shows a mobile communication system according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, the term "user equipment" (UE) may designate a terminal, a mobile terminal (MT), a mobile station (MS), an advanced mobile station (AMS), a high reliability mobile station (HR-MS), a subscriber station (SS), a portable subscriber station (PSS), an access terminal (AT), and so on, or may include all or some functions thereof.

Further, the term "base station" (BS) may designate a node B, an evolved node B (eNB), an advanced base station (ABS), a high reliability base station (HR-BS), an access point (AP), a radio access station (RAS), a base transceiver station (BTS), and so on, or may include all or some functions thereof.

Data offloading method and apparatus according to an embodiment of the present invention are described with reference to the drawings.

FIG. 1 shows a mobile communication system according to an embodiment of the present invention.

Referring to FIG. 1, a small cell is overlapped with a macro cell. A system bearer 11, for example evolved packet system (EPS) bearer, of a UE 10 has a radio bearer (RB) 12 connected to a macro cell base station 20 and a radio bearer 12 connected to a small cell base station 30. For example, the macro cell base station may be a macro-cell eNB (MeNB), and the small cell base station may be a small-cell eNB (SeNB). Hereinafter, the data radio bearer connected to the macro cell base station is referred to as "MC-RB," and the data radio bearer connected to the small cell base station is referred to as "SC-RB."

The UE 10 receives data through the MC-RB and/or the SC-RB. The UE 10 delivers the data received over the MC-RB 12 and the SC-RB 13 to a higher layer, i.e., an application 14, and processes the data on the higher layer 14.

FIG. 2, FIG. 3A to FIG. 3E schematically show a data offloading method according to an embodiment of the present invention.

Figure 2:
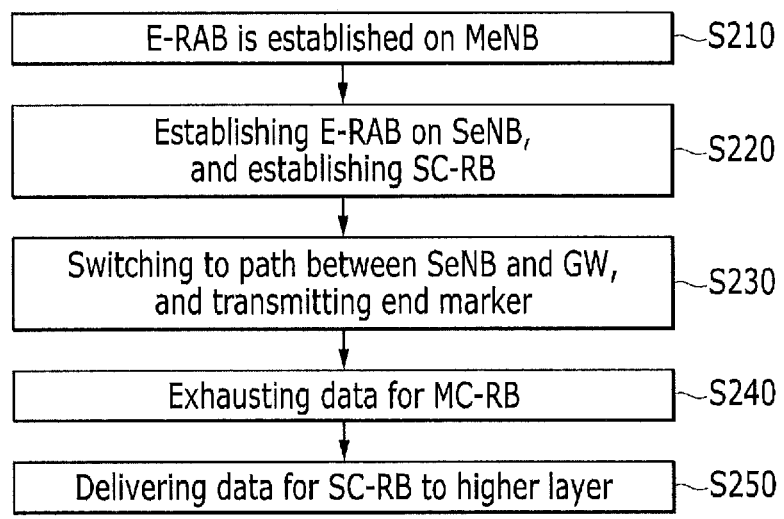
FIG. 2, FIG. 3A to FIG. 3E schematically show a data offloading method according to an embodiment of the present invention.
Figure 3A:
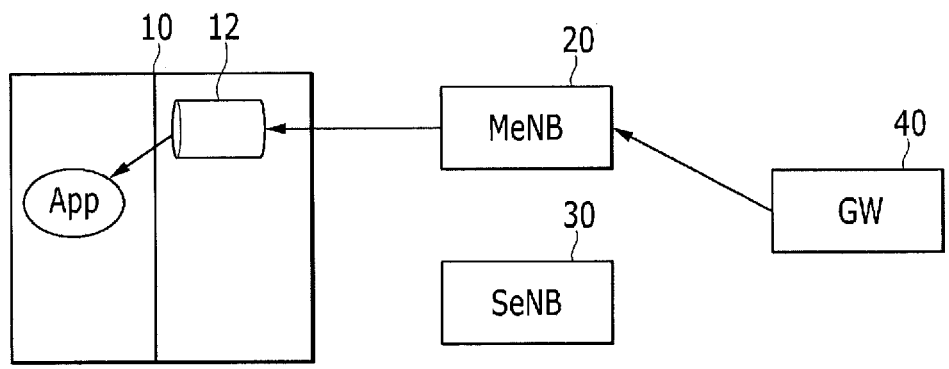

Referring to FIG. 2 and FIG. 3A, a radio access bearer (RAB) is established between a UE 10 and a gateway 40 on a macro cell base station 20 (S210). Hereinafter, the RAB is exemplified as E-RAB [EUTRAN (evolved UMTS (universal mobile telecommunications system) terrestrial radio access network) RAB]. The gateway 40 may be a serving gateway (S-GW). The UE 10 transmits and receives data over an MC-RB 12.

Figure 3B:
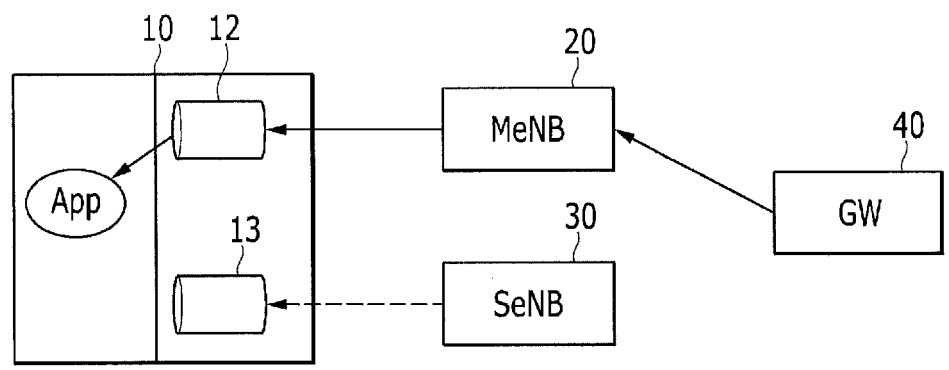

Next, as shown in FIG. 3B, a small cell base station 30 establishes E-RAB, and an SC-RB is established between the small cell base station 30 and the UE 10 (S220).

Figure 3C:
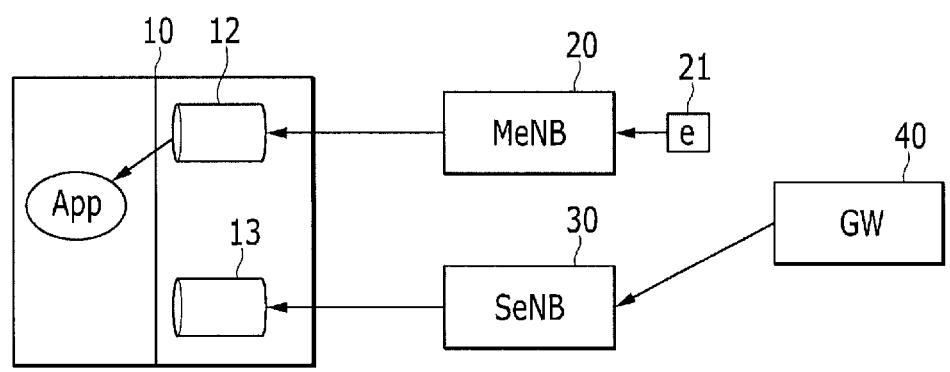

Subsequently, as shown in FIG. 3C, a path between the macro cell base station 20 and the gateway 40 is switched into a path between the small cell base station 30 and the gateway 40 (S230). The gateway 40 transmits an end marker 21 to the macro cell base station 20, and forwards the following data to the small cell (S230). The data via the small cell base station 30 is transmitted to the UE 10, and the UE 10 buffers these data for the SC-RB.

Figure 3D:
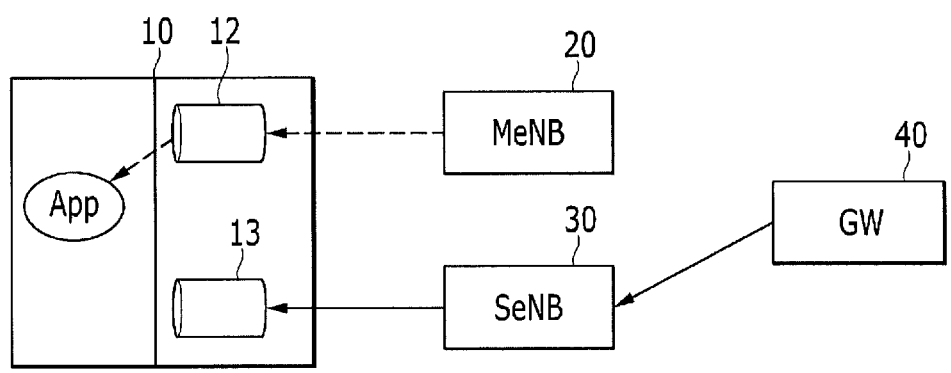
Figure 3E:
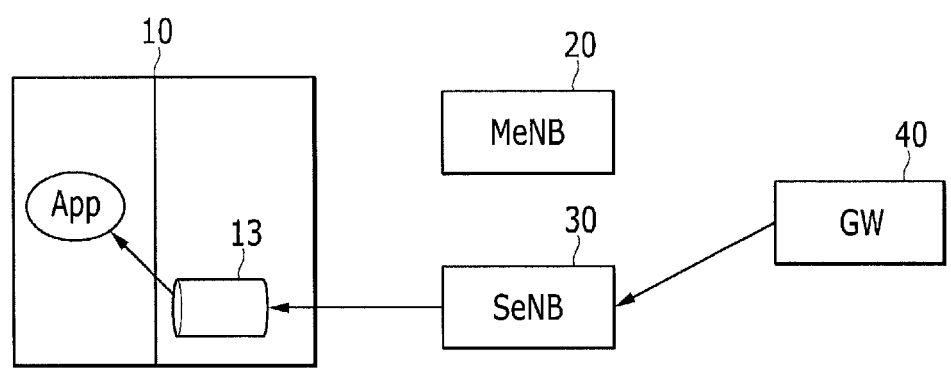

Next, when the existing data for the MC-RB are exhausted as shown in FIG. 3D (S240), the UE 10 releases buffering of the SC-RB and delivers the data to a higher layer (i.e., an application) of the UE 10 (S250) as shown in FIG. 3E. Subsequent data are provided to the UE 10 through the small cell base station 30.

By this procedure, the EPS bearer can be switched from the macro cell base station 20 to the small cell base station 30 such that the data traffics of the user can be offloaded to the small cell.

Figure 4:
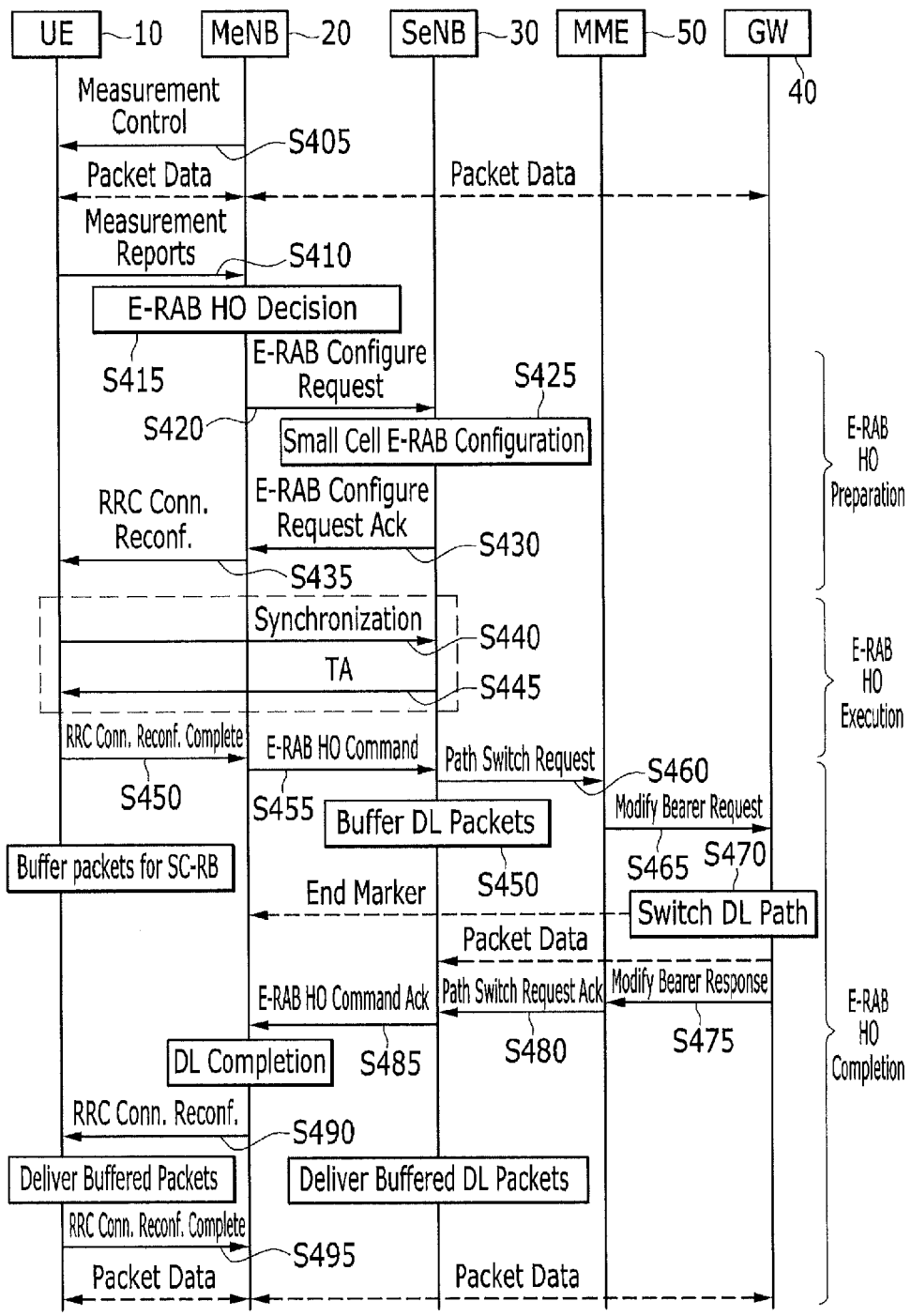
FIG. 4, FIG. 5, and FIG. 6 are a flowchart of a data offloading method according to embodiments of the present invention.

FIG. 4 is a flowchart of a data offloading method according to an embodiment of the present invention.

Referring to FIG. 4, a macro cell base station 20 starts a UE measurement process while an E-RAB is established between a UE 10 and a gateway 40 on the macro cell base station 20 (S405). For example, the macro cell base station 20 transmits a measurement control message to the UE 10, to notify information to be reported by the UE 10, i.e., measurement configuration (S405). Accordingly, the UE 10 reports a measurement result of the small cell to the macro cell base station 20 through a measurement report message (S410). The macro cell base station 20 decides whether to perform an E-RAB handover (HO) to the small cell based on the measurement result of the UE 10 and own radio resource management information (S415).

When deciding to perform the E-RAB HO to the small cell, the macro cell base station 20 executes an E-RAB HO preparation (S420, S425, S430, and S435).

The macro cell base station 20 adds mobility control information for E-RAB configuration on the small cell to an E-RAB configure request message, and transmits the E-RAB configure request message to the small cell base station 30 (S420). The mobility control information includes at least one of radio bearer setup information, E-RAB context, S1 interface setup information, and security setup information. The radio bearer setup information may include a RRC (radio resource control) connection reconfiguration message included as a transparent container. The S1 interface setup information may include signaling context reference and an identifier (ID) of a target cell, i.e., the small cell. The signaling context reference may be UE S1 EPC (evolved packet core) signaling context reference for enabling the target cell base station to address the source cell base station and the EPC. The security setup information may include a base station key. The base station key may be $K_{eNB}^*$ defined in 3GPP TS 33.401.

The small cell base station 30 establishes the E-RAB based on information included in the E-RAB configure request message (S425), and transmits an E-RAB configure request acknowledgement (ACK) message to the macro cell base station 20 to notify that the small cell completes the E-RAB setup (S430). The E-RAB configure request ACK message includes necessary information for the UE 10 to access the small cell. The necessary information may include a new UE identifier, a small cell security algorithm identifier, and a dedicated RACH (random access channel) preamble index. The new UE identifier may be a new C-RNTI (cell radio network temporary identifier).

The macro cell base station 20 receiving the E-RAB configure request ACK message transmits an RRC connection reconfiguration message to the UE 10 (S435). The RRC connection reconfiguration message includes mobility control information (i.e., the new UE identifier, the small cell security algorithm identifier, and the dedicated RACH preamble) received from the small cell base station 30. The RRC connection reconfiguration message may further include measurement configuration information for the UE measurement process at the small cell. The UE 10 receiving the RRC connection reconfiguration message establishes a radio bearer for the small cell base station 30, i.e., an SC-RB. In this case, the UE 10 does not detach from the macro cell base station 20 and maintains the MC-RB. In other words, the UE 10 concurrently maintains the MC-RB and the SC-RB.

Next, an E-RAB HO execution is performed (S440, S445, and S450).

In the case that the macro cell base station 20 does not provide a timing adjustment (TA) value, the UE 10 performs a random access process transmitting a preamble to the small cell base station 30 for the synchronization (S440). Using a dedicated RACH preamble as the preamble can allow the small cell base station 30 to identify the UE 10. The small cell base station 30 transmits the timing adjustment value to the UE 10 in response to the random access process (S445) such that the UE 10 can perform timing synchronization with the small cell base station 30.

Alternatively, the RRC connection reconfiguration message transmitted at the step S435 may include the timing adjustment value for the timing synchronization with the small cell base station 30. In this case, the UE 10 can omit a process (S440 and S445) for performing the timing synchronization with the small cell base station 30.

After establishing the SC-RB, the UE 10 transmits an RRC connection reconfiguration complete message to the macro cell base station 20 as the response of the RRC connection reconfiguration message (S450). The UE 10 does not transmit data for the uplink (UL) SC-RB toward the small cell, and buffers the data. Further, the UE 10 does not deliver to the higher layer (i.e., the application) buffered data for the downlink (DL) SC-RB transmitted from the small cell base station 30. Furthermore, the UE 10 consecutively transmits remaining data for the UL MC-RB to the macro cell base station 20, and consecutively delivers the buffered data for the DL MC-RB to the higher layer of the UE 10. As such, the UE 10 can overlap the MC-RB and the SC-RB, and exhaust the buffer of the MC-RB while temporarily suspending the buffer of the newly established SC-RB.

Next, E-RAB HO completion is performed (S455, S460, S465, S470, S475, S480, S485, S490, and S495).

The macro cell base station 20 initiates a switch process for switching the currently established path between the macro cell base station 20 and the gateway 40 to a path between the small cell base station 30 and the gateway 40. The macro cell base station 20 transmits an E-RAB HO command message to the small cell base station 30 (S455). The small cell base station 30 transmits a path switch request message to a mobility management entity (MME) 50 (S460). At this time, the small cell base station 30 may not transmit data and temporarily buffer the data over the newly established DL SC-RB.

Subsequently, the MME 50 transmits a modify bearer request message to the gateway 40 (S465). The gateway 40 receiving the modify bearer request message switches a DL path, and transmits an end marker at the end of packets which are transmitted to the macro cell base station 20 (S470). Accordingly, the packets transmitted to the macro cell base station 20 are terminated, and data are forwarded to the small cell base station 30 through the newly established path between the gateway 40 and the small cell base station 30 by the switch process. The data forwarded to the small cell base station 30 may be buffered for the SC-RB in the small cell base station 30. Accordingly, differently from the conventional handover, the data cannot be transferred between the source base station (i.e., the macro cell base station 20) and the target base station (i.e., the small cell base station 30), and data continuity can be guaranteed. The gateway 40 transmits a modify bearer response message to the MME 50 in response to the modify bearer request message (S475).

The MME 50 transmits a path switch request ACK message to the small cell base station 30 in response to the path switch request message (S480). Accordingly, the small cell base station 30 recognizes that the path is established between the small cell base station 30 and the gateway 40, and transmits the buffered SC-RB data to the UE 10. As such, the SC-RB of the small cell base station 30 can be temporarily buffered and then released.

The small cell base station 30 transmits an E-RAB HO command ACK message to the macro cell base station 20 in response to the E-RAB HO command (S485). The macro cell base station 20 receiving the E-RAB HO command ACK message recognizes that the E-RAB HO is completed. Further, when the MC-RB data received by the end marker are exhausted, the macro cell base station 20 transmits an RRC connection reconfiguration to release the MC-RB maintained between the UE 10 and the macro cell base station 20 (S490).

The UE 10 receiving the RRC connection reconfiguration message releases the MC-RB, and switches the MC-RB to the SC-RB. Accordingly, the UL SC-RB transmits data to the small cell base station 30, and data of the DL SC-RB are delivered to the higher layer of the UE 10. The UE 10 transmits an RRC connection reconfiguration complete message to the macro cell base station 20 in response to the RRC connection reconfiguration message (S495).

In FIG. 4, the messages at the steps S405, S410, S420, S430, S435, S450, S455, S460, S465, S475, S480, S485, S490, and S495 may be transferred by L3 (layer 3) signaling, and the messages at the steps S440 and S445 may be transferred by L1/L2 (layer 1/2) signaling.

By performing the above procedure, the EPS bearer can be moved from the macro cell base station 20 to the small cell base station 30. Accordingly, the data offloading can be performed without traffic disconnection, and the data transfer overload occurred between the base stations in the conventional handover can be eliminated.

Figure 5:
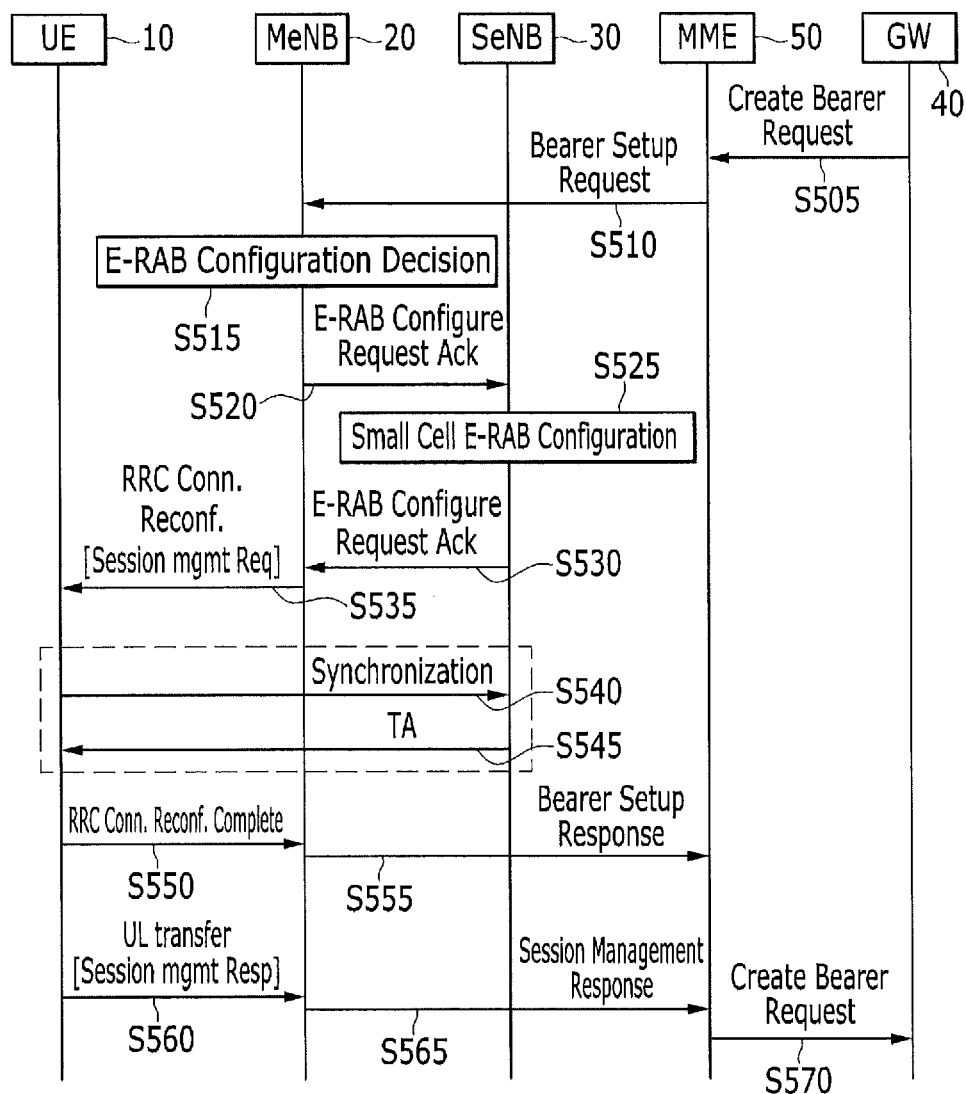

FIG. 5 is a flowchart of a data offloading method according to another embodiment of the present invention.

Referring to FIG. 5, while an E-RAB is established between a UE 10 and a gateway 40 on a macro cell base station 20 and data are transmitted over an MC-RB from the macro cell base station 20 to the UE 10, a gateway 40 transmits a create bearer request message to an MME 50 to establish a new dedicated EPS bearer (S505). The MME 50 transmits a bearer setup request message to the macro cell base station 20 to which the UE 10 belongs (S510). The bearer setup request message includes S1 interface information issued by the gateway 40.

The macro cell base station 20 decides to establish an E-RAB on a small cell based on measurement result and radio resource management information (S515). The macro cell base station 20 transmits an E-RAB configuration request message to a small cell base station 30 (S520). The E-RAB configuration request message includes information for E-RAB configuration on the small cell. The information for E-RAB configuration may include S1 interface necessary information for configuring an S1 connection between the small cell base station 30 and the gateway 40.

The small cell base station 30 establishes the E-RAB on the small cell according to contents of the E-RAB configuration request message (S525), and transmits an E-RAB configuration request ACK message to the macro cell base station 20 to notify that the small cell completes the E-RAB setup (S530). The E-RAB configuration request ACK message includes information which the UE 10 needs to access the small cell. The information which the UE 10 needs to access the small cell may include a new UE identifier, a small cell security algorithm identifier, and a dedicated RACH preamble index. The E-RAB configuration request ACK message may further include S1 interface configuration information necessary for the S1 connection between the small cell base station 30 and the gateway 40.

The macro cell base station 20 receiving the E-RAB configuration request ACK message transmits an RRC connection reconfiguration message to the UE 10 (S535). The RRC connection reconfiguration message includes information received from the small cell base station 30, i.e., the new UE identifier, the small cell security algorithm identifier, and the dedicated RACH preamble index. The RRC connection reconfiguration message may further include measurement configuration information for the UE measurement process at the small cell. The RRC connection reconfiguration message may further include a session management request message for establishing a new dedicated EPS bearer. The UE 10 receiving the RRC connection reconfiguration message establishes a radio bearer for the small cell base station 30, i.e., an SC-RB.

The RRC connection reconfiguration message may further include a timing adjustment (TA) value timing synchronization with the small cell base station 30. In the case that the RRC connection reconfiguration message does not include the timing adjustment value, the UE 10 transmits a preamble to the small cell base station 30 (S540), and the small cell base station 30 transmits the timing adjustment value to the UE 10 (S545), as described with reference to FIG. 4.

Next, the UE 10 transmits an RRC connection reconfiguration complete message to the macro cell base station 20 as response of the RRC connection reconfiguration message (S550). The macro cell base station 20 transmits a bearer setup response message to the MME 50 (S555). The bearer setup response message includes the S1 interface configuration information between the small cell base station 30 and the gateway 40, obtained at the step S530.

The UE 10 transmits a UL transfer message to the macro cell base station 20 as response of the session management request message (S560). The UL transfer message includes a session management response message. The macro cell base station 20 receiving the UL transfer message transmits the session management response message to the MME 50 (S565). The MME 50 receiving the bearer setup response message and the session management response message transmits a create bearer response message to the gateway 40 (S570).

In FIG. 5, the messages at the steps S505, S510, S520, S530, S535, S550, S555, S560, S565, and S570 may be transferred by L3 signaling, and the messages at the steps S540 and S545 may be transferred by L1/L2 signaling.

By performing the above procedure, the dedicated EPS bearer of the small cell base station 30 can be established by directly using resources of the small cell without using resources of the macro cell. Accordingly, the EPS bearer can be moved from the macro cell base station 20 to the small cell base station 30 such that the data traffics can be offloaded to the small cell.

Figure 6:
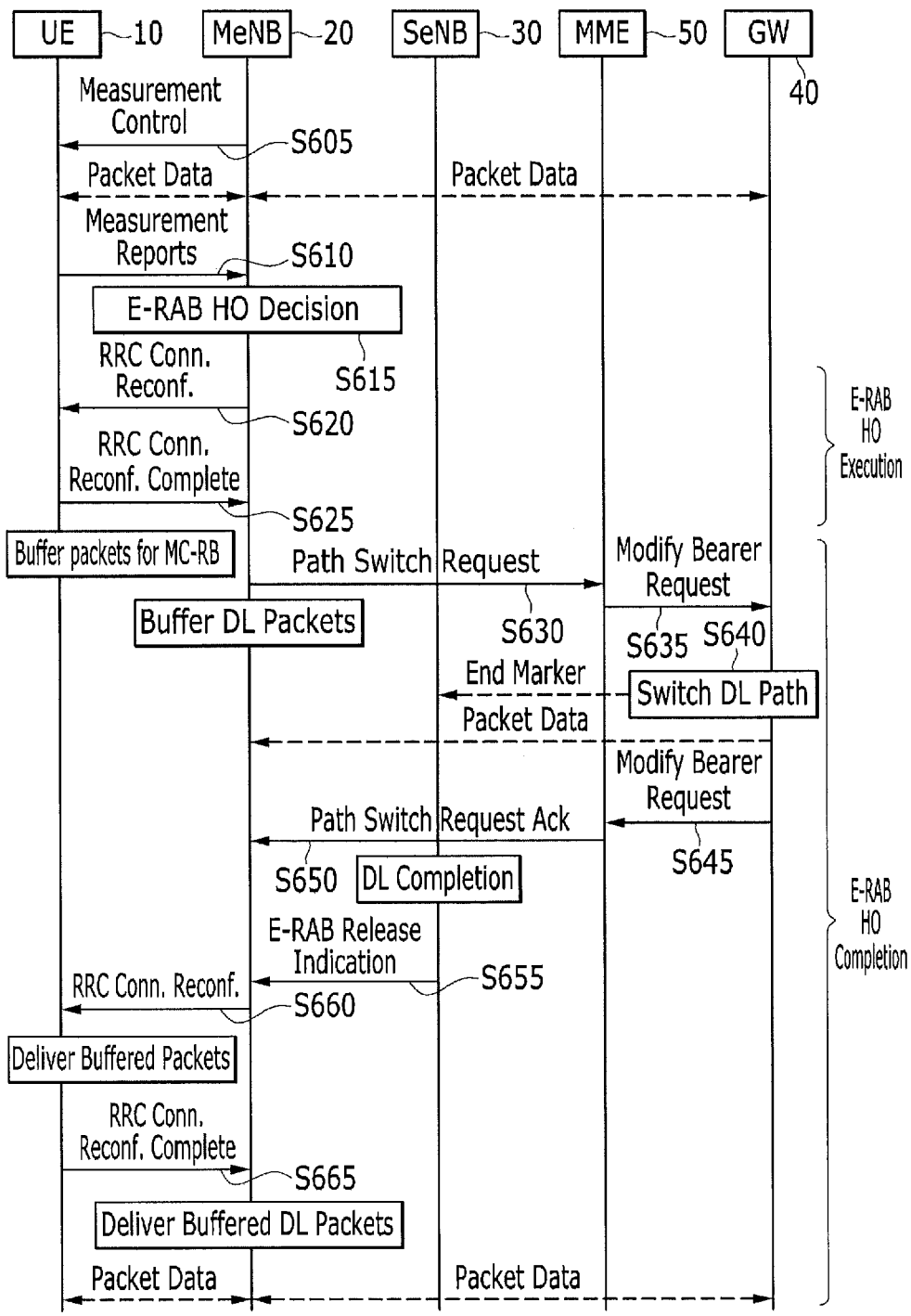

FIG. 6 is a flowchart of a data offloading method according to another embodiment of the present invention. FIG. 6 shows an E-RAB HO in which an E-RAB is moved from a small cell to a macro cell.

Referring to FIG. 6, a macro cell base station 20 starts a UE measurement process while the E-RAB is established between a UE 10 and a gateway 40 on the small cell base station 30 (S605). Accordingly, the UE 10 reports a measurement result of the small cell to the macro cell base station 20 through a measurement report message (S610). The macro cell base station 20 decides whether to perform an E-RAB HO to the macro cell based on the measurement result of the UE 10 and radio resource management information (S615).

When deciding to perform the E-RAB HO to the macro cell, the macro cell base station 20 executes an E-RAB HO preparation (S620 and S625).

The macro cell base station 20 transmits an RRC connection reconfiguration message to the UE 10 (S620). Since the UE 10 is attached to the macro cell base station 20, the UE 10 does not need to transmit a preamble for synchronization with the macro cell base station 20. The UE 10 establishes a radio wireless (MC-RB) for the macro cell base station 20, and transmits an RRC connection reconfiguration complete message to the macro cell base station 20 (S625).

In this case, the UE 10 does not transmit data for the UL MC-RB toward the macro cell, and buffers the data. Further, the UE 10 does not deliver to the higher layer buffered data for the DL MC-RB transmitted from the macro cell base station 30. Furthermore, the UE 10 consecutively transmits remaining data for the UL SC-RB to the small cell base station 30, and consecutively delivers the buffered data for the DL SC-RB to the higher layer of the UE 10. As such, the UE 10 can exhaust the buffer of the SC-RB while temporarily suspending the buffer of the newly established MC-RB.

Next, E-RAB HO completion is performed (S630, S635, S640, S645, S650, S660, S665, and S670).

The macro cell base station 20 initiates a switch process for switching the currently established path between the small cell base station 30 and the gateway 40 to a path between the macro cell base station 20 and the gateway 40. The macro cell base station 20 transmits a path switch request message to an MME 50 (S630). At this time, the macro cell base station 20 may not transmit data and temporarily buffer the data over the newly established DL MC-RB.

Subsequently, the MME 50 transmits a modify bearer request message to the gateway 40 (S635). The gateway 40 receiving the modify bearer request message switches a DL path, and transmits an end marker at the end of packets which are transmitted to the small cell base station 30 (S640). Accordingly, the packets transmitted to the small cell base station 30 are terminated, and data are forwarded to the macro cell base station 20 through the newly established path between the gateway 40 and the macro cell base station 20 by the switch process. The data forwarded to the macro cell base station 20 may be buffered to the MC-RB in the macro cell base station 20. The gateway 40 transmits a modify bearer response message to the MME 50 in response to the modify bearer request message (S645).

The MME 50 transmits a path switch request ACK message to the macro cell base station 20 in response to the path switch request message (S650). Accordingly, the macro cell base station 20 recognizes that the path is established between the macro cell base station 20 and the gateway 40.

When the SC-RB data received by the end marker are exhausted, the small cell base station 30 transmits an E-RAB release indication message to macro cell base station 20 (S655). Then, the macro cell base station 20 transmits an RRC connection reconfiguration to the UE 10 to allow the UE 10 to start an MC-RB connection (S660). The UE 10 receiving the RRC connection reconfiguration message releases the SC-RB, and switches the SC-RB to the MC-RB. Accordingly, the UL MC-RB transmits data to the macro cell base station 30, and data for the DL MC-RB are delivered to the higher layer of the UE 10. The UE 10 transmits an RRC connection reconfiguration complete message to the macro cell base station 20 in response to the RRC connection reconfiguration message (S665). The macro cell base station 20 releases buffering of the MC-RB.

In FIG. 6, the messages at the steps S605, S610, S620, S625, S630, S635, S645, S650, S655, S660, and S665 may be transferred by L3 signaling.

By performing the above procedure, the EPS bearer can be moved from the small cell base station 30 to the macro cell base station 20.

Figure 7:
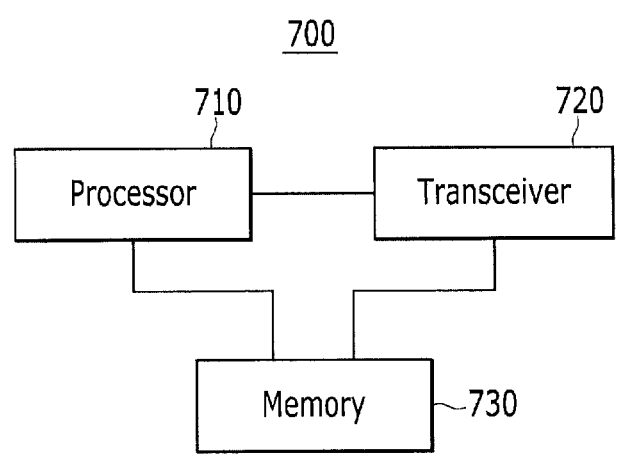
FIG. 7 is a schematic block diagram of a data offloading apparatus according to an embodiment of the present invention.

FIG. 7 is a schematic block diagram of a data offloading apparatus according to an embodiment of the present invention.

Referring to FIG. 7, a data offloading apparatus 700 includes a processor 710, a transceiver 720, and a memory 730. The data offloading apparatus 700 may be included in an entity such as an UE 10, a macro cell base station 20, or a small cell base station 30, or may be the entity itself.

The transceiver 720 transmits generated messages, or receives messages from other entity. The memory 730 stores instructions for performing the steps of a corresponding entity described with reference to FIG. 3 to FIG. 6, or loads the instructions from a storage device (not shown) and temporarily stores them. Further, the memory may temporarily store the messages generated by the corresponding entity and the received messages. The processor 710 executes the instructions stored or loaded in the memory 730 to perform the steps of the corresponding entity described with reference to FIG. 3 to FIG. 6.

The processor 710 and the memory 730 may be connected through a bus (not shown), and an input/output interface (not shown) may be connected to the bus. The input/output interface may be connected with the transceiver 720 and peripheral devices such as an input device, a display device, a speaker, and/or the storage device.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of offloading data by a user equipment (UE), the method comprising:

receiving data from a macro cell base station over a first radio bearer between the UE and the macro cell base station while a radio access bearer between the macro cell base station and a gateway is established;

receiving a first connection reconfiguration message from the macro cell base station after a radio access bearer between a small cell base station and the gateway is established;

establishing a second radio bearer between the UE and the small cell base station according to the first connection reconfiguration message;

receiving a second connection reconfiguration message from the macro cell base station after a path between the macro cell base station and the gateway is switched to a path between the small cell base station and the gateway, and data for the first radio bearer are exhausted on the macro cell base station; and releasing the first radio bearer and switching to the second radio bearer according to the second connection reconfiguration message.

2. The method of claim 1, further comprising:
buffering data transmitted from the small cell base station in the second radio bearer while the data for the first radio bearer are exhausted,
wherein switching to the second radio bearer comprises delivering the buffered data for the second radio bearer to a higher layer.

3. The method of claim 1, further comprising:
maintaining the first radio bearer while establishing the second radio bearer.

4. The method of claim 1, further comprising:
receiving a timing adjustment value for the UE from the macro cell base station,
wherein a random access process to the small cell base station is omitted when the timing adjustment value is received.

5. A method of offloading data by a macro cell base station, the method comprising:
transmitting data to a user equipment (UE) over a first radio bearer between the UE and the macro cell base station while a radio access bearer between the macro cell base station and a gateway is established;
transmitting a radio access bearer setup request to a small cell base station;
transmitting a first connection reconfiguration message to the UE to request for establishing a second radio bearer between the UE and the small cell base station after the radio access bearer between the small cell base station and the gateway is established;
transmitting a handover command to the small cell base station after the second radio bearer is established;
receiving an end marker indicating an end of data from the gateway after a path between the macro cell base station and the gateway is switched to a path between the small cell base station and the gateway according to the handover command; and
transmitting a second connection reconfiguration message to the UE to request for switching the first radio bearer to the second radio bearer when data of the first radio bearer are exhausted.

6. The method of claim 5, further comprising:
maintaining the first radio bearer while the second radio bearer is established.

7. The method of claim 5, further comprising:
transmitting to the UE a timing adjustment value for the UE.

8. A method of offloading data by a macro cell base station, the method comprising:
transmitting data to a user equipment (UE) over a first radio bearer between the UE and the macro cell base station while a radio access bearer between the macro cell base station and a gateway is established;
receiving a bearer setup request message from a mobility management entity according to a request of the gateway;
transmitting a radio access bearer configuration request message to a small cell base station according to the bearer setup request message;

transmitting a connection reconfiguration message to the UE to request for establishing a second radio bearer between the UE and the small cell base station after the radio access bearer between the small cell base station and the gateway is established according to the radio access bearer configuration request message; and
transmitting a response message of the bearer setup request message to the mobility management entity after the second radio bearer is established.

9. The method of claim 8, wherein the radio access bearer configuration request message comprises S1 interface information issued by the gateway.

10. The method of claim 8, further comprising:
receiving a radio access bearer configuration request acknowledgement message from the small cell base station after the radio access bearer between the small cell base station and the gateway is established,
wherein the radio access bearer configuration request acknowledgement message comprises S1 interface configuration information necessary for an S1 connection between the small cell base station and the gateway.

11. A method of offloading data by a small cell base station, the method comprising:
receiving a radio access bearer configuration request message from a macro cell base station according to a request of the gateway while data are transmitted to a user equipment (UE) over a first radio bearer between the UE and the macro cell base station;
establishing a radio access bearer between the small cell base station and the gateway according to the radio access bearer configuration request message; and
transmitting a radio access bearer configuration request acknowledgement message to the macro cell base station,
wherein a second radio bearer between the UE and the small cell base station is established after the radio access bearer configuration request acknowledgement message is transmitted.

12. The method of claim 11, wherein the radio access bearer configuration request message comprises S1 interface information issued by the gateway.

13. The method of claim 11, wherein the radio access bearer configuration request acknowledgement message comprises S1 interface configuration information necessary for an S1 connection between the small cell base station and the gateway.

14. The method of claim 11, further comprising:
transmitting to the UE a timing adjustment value for the UE.

15. A method of offloading data by a user equipment (UE), the method comprising:
receiving data from a small cell base station over a first radio bearer between the UE and the small cell base station while a radio access bearer between the small cell base station and a gateway is established;
receiving a first connection reconfiguration message from a macro cell base station;
establishing a second radio bearer between the UE and the macro cell base station according to the first connection reconfiguration message;
receiving a second connection reconfiguration message from the macro cell base station after a path between the small cell base station and the gateway is switched to a path between the macro cell base station and the gateway, and data for the first radio bearer are exhausted on the small cell base station; and releasing the first radio bearer and switching to the second radio bearer according to the second connection reconfiguration message.

16. The method of claim 15, further comprising:
buffering data transmitted from the macro cell base station in the second radio bearer while the data for the first radio bearer are exhausted,
wherein switching to the second radio bearer comprises delivering the buffered data for the second radio bearer to a higher layer.

17. The method of claim 15, further comprising:
maintaining the first radio bearer while establishing the second radio bearer.

18. A method of offloading data by a macro cell base station, the method comprising:
transmitting a first connection reconfiguration message to a user equipment (UE) to request for establishing a first radio bearer between the UE and the macro cell base station while data are transmitted over a second radio bearer between the UE and the small cell base station;
transmitting a path switch request to a mobility management entity after the first radio bearer is established;
receiving a radio access bearer release indication message from the small cell base station after a path between the small cell base station and the gateway is switched to a path between the macro cell base station and the gateway; and
transmitting a second connection reconfiguration message to the UE to request for switching the first radio bearer to the second radio bearer according to the radio access bearer release indication message.

19. The method of claim 18, wherein the radio access bearer release indication message is transmitted when data for the first radio bearer are exhausted in the small cell base station.

20. The method of claim 19, wherein the second radio bearer is maintained while the first radio bearer is established.

* * * * *